(12) United States Patent
Raff et al.

(10) Patent No.: US 10,397,246 B2
(45) Date of Patent: *Aug. 27, 2019

(54) SYSTEM AND METHODS FOR MALWARE DETECTION USING LOG BASED CROWDSOURCING ANALYSIS

(71) Applicant: Seculert Ltd., Petah Tikva (IL)

(72) Inventors: Aviv Raff, Kiryat Ono (IL); Doron Peri, Tel Aviv (IL); Amnon Lotem, Ramot Hashavim (IL)

(73) Assignee: Radware, Ltd., Tel Aviv (IL)

( * ) Notice: Subject to any disclaimer, the term of this patent is extended or adjusted under 35 U.S.C. 154(b) by 173 days.

This patent is subject to a terminal disclaimer.

(21) Appl. No.: 14/738,959

(22) Filed: Jun. 15, 2015

(65) Prior Publication Data

US 2015/0381637 A1 Dec. 31, 2015

Related U.S. Application Data

(63) Continuation-in-part of application No. 13/810,450, filed as application No. PCT/IB2011/053253 on Jul. 21, 2011, now Pat. No. 9,270,690.

(60) Provisional application No. 61/366,168, filed on Jul. 21, 2010, provisional application No. 61/411,006, filed on Nov. 8, 2010, provisional application No. 61/482,223, filed on May 4, 2011.

(51) Int. Cl.
*H04L 29/06* (2006.01)

(52) U.S. Cl.
CPC ...... *H04L 63/1416* (2013.01); *H04L 63/0218* (2013.01); *H04L 63/145* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,904,958 B2 | 3/2011 | Lee | |
| 8,156,541 B1 | 4/2012 | Thomas et al. | |
| 8,510,840 B2 | 8/2013 | Futamura | |
| 8,769,684 B2 | 7/2014 | Stolfo et al. | |
| 8,793,787 B2 | 7/2014 | Ismael et al. | |
| 9,009,829 B2 | 4/2015 | Stolfo et al. | |
| 9,043,894 B1* | 5/2015 | Dennison | G06F 16/9535 726/11 |
| 9,270,563 B1* | 2/2016 | Brouillette | H04L 43/0876 |
| 9,350,601 B2* | 5/2016 | Jain | H04L 41/0654 |
| 9,571,640 B1* | 2/2017 | Chen | H04M 3/436 |
| 2008/0080518 A1 | 4/2008 | Hoeflin et al. | |

(Continued)

*Primary Examiner* — Trang T Doan
(74) *Attorney, Agent, or Firm* — M&B IP Analysts, LLC

(57) ABSTRACT

A crowdsourcing log analysis system and methods for protecting computers and networks from malware attacks by analyzing data log information obtained from a plurality of client network. The client networks are associated with a set of network entities representing a plurality of business units or customers. The system may further comprise a plurality of server machines, each operable to execute a security product associated with a security product vendor and log associated information of at the network entities into at least one log file. The log files may be uploaded onto a breach detection platform for analysis based upon crowdsourcing principles and is operable to generate a risk factor attribute for at least one suspect entity.

27 Claims, 8 Drawing Sheets

(56) References Cited

U.S. PATENT DOCUMENTS

| | | | |
|---|---|---|---|
| 2008/0307526 A1 | 12/2008 | Chung et al. | |
| 2009/0044024 A1 | 2/2009 | Oberheide et al. | |
| 2009/0249481 A1 | 10/2009 | Long et al. | |
| 2009/0254989 A1 | 10/2009 | Achan et al. | |
| 2010/0037314 A1 | 2/2010 | Perdisci et al. | |
| 2010/0050249 A1* | 2/2010 | Newman | H04L 63/126 726/15 |
| 2010/0115621 A1 | 5/2010 | Staniford et al. | |
| 2010/0162350 A1 | 6/2010 | Jeong et al. | |
| 2011/0035390 A1 | 2/2011 | Whitehouse | |
| 2011/0035781 A1 | 2/2011 | Moghe | |
| 2011/0126136 A1 | 5/2011 | Abella et al. | |
| 2012/0203900 A1 | 8/2012 | Wang et al. | |
| 2012/0204264 A1 | 8/2012 | Jiang | |
| 2013/0091570 A1 | 4/2013 | McCorkendale et al. | |
| 2013/0144879 A1* | 6/2013 | Kuehnel | H04L 47/34 707/736 |
| 2013/0254880 A1* | 9/2013 | Alperovitch | G06F 21/51 726/22 |
| 2014/0007238 A1* | 1/2014 | Magee | G06F 21/577 726/24 |
| 2014/0051432 A1* | 2/2014 | Gupta | G06F 21/57 455/425 |
| 2014/0165188 A1* | 6/2014 | Giblin | H04L 63/10 726/21 |
| 2014/0245436 A1 | 8/2014 | Dagon et al. | |
| 2015/0026594 A1* | 1/2015 | Dave | H04L 65/403 715/753 |
| 2015/0106889 A1* | 4/2015 | Sharabani | G06F 16/95 726/5 |
| 2015/0244732 A1* | 8/2015 | Golshan | G06F 21/561 726/24 |
| 2015/0326588 A1* | 11/2015 | Vissamsetty | H04L 63/1491 726/23 |
| 2015/0326592 A1* | 11/2015 | Vissamsetty | H04L 63/1408 726/24 |
| 2016/0205115 A1* | 7/2016 | Kulkarni | G06F 21/568 726/1 |
| 2016/0269436 A1* | 9/2016 | Danielson | H04L 63/1433 |

\* cited by examiner

SYSTEM AND METHODS FOR MALWARE DETECTION USING LOG BASED CROWDSOURCING ANALYSIS

FIELD OF THE INVENTION

The present invention relates to internet security and crowdsourcing. In particular the invention relates to protecting computers and networks from malware attacks by analyzing event data logs obtained from a plurality of client networks representing a plurality of business units or customers.

BACKGROUND OF THE INVENTION

Internet security is challenging, and the types of threats computers are exposed to are rapidly increasing. Software infecting computers is commonly known as malware, referring to a variety of forms of hostile or intrusive software.

Accordingly, computers infected with malware may expose various indicators such as strange computer behavior; slow computer or web browser speeds; increased CPU usage; freezing or crashing; modified or deleted files; problems connecting to networks; appearance of strange files, programs, or desktop icons; programs running, turning off, or reconfiguring themselves (malware will often reconfigure or turn off antivirus and firewall programs); emails/messages being sent automatically without user's knowledge and more.

SUMMARY OF THE INVENTION

There is a need for a wide scope system providing accurate, reliable and automated malware detection system while providing unique visibility to analyze malware patterns based upon a plurality of client networks associated with a plurality of business units. The current disclosure addresses this need.

Malware types may include examples of computer viruses, worms, bankers, proxy, DDoS, password stealers, fake anti-virus, spammers, downloaders, trojan horses, ransomware, spyware, adware, and other malicious programs.

The term 'worms' is given to self-replicating malware which uses a computer network to send copies of itself to other computers on the network.

The term 'bankers' is given to malware which steals banking information.

The term 'DoS' is given to malware which is used for Denial-of-Service attack against websites or networks.

The term 'password stealers' is given to malware which steals any type of information.

The term 'Fake Anti-Virus' is given to malware which misleads users into paying for a fake removal of malware.

The term 'Spammers' is given to malware which uses an infected computer to send spam emails.

The term 'Downloaders' is given to malware which downloads other malware to an infected computer.

The term 'trojan horse' (commonly referred to as Trojan) is given to a type of malware that disguises itself as a normal file or program to fake users into downloading and installing malware. A Trojan can give a malicious party remote access to an infected computer.

The term 'ransomware' is given to a form of malware that essentially holds a computer system captive while demanding a ransom. The malware restricts user access to the computer either by encrypting files on the hard drive or locking down the system and displaying messages that are intended to force the user to pay the malware creator.

The term 'spyware' is given to a type of malware that functions by spying on user activity without their knowledge. These spying capabilities can include activity monitoring, collecting keystrokes, data harvesting (account information, logins, financial data), and more.

The term 'adware' refers to advertising-supported software and is given to a type of malware that automatically delivers advertisements. Generally, adware is designed to deliver advertisements, but it is not uncommon for adware to come bundled with spyware (see below) that is capable of tracking user activity and stealing information.

Malware types may be differentiated according to criteria such as self-distribution, point of control, data stealing, level of protection and the like. The self-distribution is the capability of the malware to spread itself to other computers. Point of control refers to the capability of the malware to be controlled by a central remove server, for example its vulnerability to receiving commands, sending information, automatic updating and the like. Data stealing refers to the capability of the malware to send information from the computer to a remote server.

The level of protection against malware refers to the systems put into place by the malware author in order to decrease detection by end point security products, such as anti-virus software, malware detection software, and the like, and gateway protection software, such as firewalls and the like. For example, some malware is designed to be polymorphic, for example changing executable signature, while maintaining the malware payload. Some malware may use encryption of the network communication between the malware and a drop zone at a criminal server.

Cyber criminals use different methods to infect machines with malware. Examples include the social engineering, exploitation of specific vulnerabilities, use of exploit kits, distribution of email attachment and the like.

Social engineering is one method for deceiving users into downloading malware. In one example a website which offers to show a video. In order to view the video the user is required to download software purporting to be an update for commonly used software such as Adobe Flash or the like. In reality the update is an executable file installing malware onto the host.

Specific vulnerability may be identified and exploited, certain malicious webpages, for example, exploit known vulnerabilities of a browser, application or operating system in order to install the malware surreptitiously.

Exploit kits are a collections of exploits traded in the underground, and used by cyber criminals to increase the probability of installing the malware surreptitiously.

Email attachments are often used to distribute malware to unsuspecting recipients. For example, executable files may be attached to spam email or email purporting to be from a member of the user's contact list. A botnet generally comprises a set of malware infected computers, or bots, all connected to a common criminal sever, also known as a bot server, or a bot server set comprising a plurality of bot servers. The bot server or bot server set may include a command and control module, which is able to control all the infected computers, an update module which updates the malware code in the infected computers, and a drop zone for collecting data received from the infected computers.

The drawback of prior art malware detection systems is the difficulty in analyzing solid information representing the normal practice of business units or customers combined with the need to apply continuous learning processes to enable discovery of hidden patterns of potential attackers. Systems are required to be capable of providing extensive coverage of many malware family types, regardless of their characteristics and methods of infection with new patterns emerging constantly.

According to one aspect of the presently disclosed subject matter, there is provided a crowdsourcing log analysis system for protecting a plurality of client networks from security threats, each of the plurality of client networks is associated with a set of network entities, the system comprising at least one breach detection platform operable to receive a plurality of log files from the plurality of client networks via a communication network, a plurality of server machines, each of the plurality of server machines operable to execute a third-party security product and log associated third-party assessment attributes of at least one suspect entity into at least one log file and the plurality of client networks, each of the plurality of client networks operable to connect with at least one of the plurality of server machines. The crowdsourcing log analysis system is operable to generate a risk factor for the at least one suspect entity based upon at least a plurality of the third-party assessment attributes.

Variously, the at least one suspect entity may be selected from a group consisting of an external network entity, an internal network entity, a URL pattern, a destination host, a user agent and combinations thereof.

Accordingly, the at least one breach detection platform may be operable to collect data pertaining to the set of network entities, to normalize the data and to store the normalized data into at least one entity record of a data repository.

Variously, the crowdsourcing log analysis system of claim 1, the risk factor may be selected from a group consisting of: malicious, non-malicious, threatening, non-threatening, legitimate and suspicious.

As appropriate, the at least one breach detection platform may be further operable to generate an output report comprising data pertaining to the risk factor associated with the at least one suspect entity.

As appropriate, the output report may be configured to be transmitted via the communication network to one of the plurality of client networks.

As appropriate, the at least one breach detection platform may be operable to generate an alert associated with a detectable security incident associated with one of the set of network entities, the alert is configured to be transmitted via the communication network.

According to another aspect of the presently disclosed subject matter, there is provided a method for generating a risk factor for protecting a plurality of client networks from security threats, each of the plurality of client networks is associated with a set of network entities, for use in a system comprising at least one breach detection platform and a plurality of server machines associated with the plurality of client networks, each of the plurality of server machines operable to execute at least one third-party security product and log associated information, the at least one breach detection platform and the plurality of server machines being connected via a communication network, the method for operating the at least one breach detection platform in an improved manner, the method comprising: retrieving, via the communication network, a plurality of log files from the plurality of client networks, each of the plurality of log files comprising at least one log record structured in a plurality of a third-party formats (TPF); normalizing each of the plurality of log files by mapping a plurality of assessment attributes pertaining to at least one suspect entity from the plurality of third-party format into a standard format of at least one entity record; aggregating the plurality of log files into at least one data repository; and generating a risk factor for the at least one suspect entity, the risk factor characterized by an entity score.

Variously, the at least one suspect entity of the method, may be selected from a group consisting of an external network entity, an internal network entity, a URL pattern, a destination host, a user agent and combinations thereof.

Variously, the entity score of the method, may be selected from a group consisting of a Boolean value, a numerical value, a unit interval, a value within a range, a percentage value, a decimal value, a numerical ratio value, a key word, a descriptive text, a tagged label and combinations thereof.

Variously, the risk factor of the method, may be selected from a group consisting of malicious, non-malicious, threatening, non-threatening, legitimate and suspicious.

As Appropriate, the data repository of the method comprises at least one database.

As appropriate, the method step of aggregating the plurality of log files comprises retrieving at least one assessment attribute from the at least one log record; associating the at least one assessment attribute with a new entity record; and storing the new entity record.

As appropriate, the method step of aggregating the plurality of log files comprises retrieving at least one assessment attribute from the at least one log record; associating the at least one assessment attribute with an existing entity record; and updating the existing entity record.

As appropriate, the method step of generating the risk factor for a suspect entity comprises performing a voting analysis by assigning to the at least one suspect entity the count of the at least one third-party security product determining that one of the set of network entities is considered as a malicious entity.

As appropriate, the method step of performing voting analysis further comprises performing rule mapping analysis such that the entity score is mapped to a known entity score.

As appropriate, the method step of generating a risk factor for a suspect entity comprises assigning a weighting factor to the at least one third-party security product, the weighting factor representing risk factor reliability of the at least one third-party security product; generating a weighted risk value for each of the set of network entities, the weighted risk value being the product of the risk rating assigned by the at least one third-party security product and the associated weighting factor; and finding the average value of a plurality of the weighted risk values.

As appropriate, the method further comprising the step of generating an output report comprising data pertaining to the risk factor associated with the at least one suspect entity. Accordingly, the output report may be configured to be transmitted via the communication network to one of the plurality of client networks.

As appropriate, the method further comprising the step of generating an alert associated with a detectable security incident associated with one of the set of network entities, the alert may be configured to be transmitted via the communication network.

As appropriate, the step of generating a risk factor further comprises classifying each of the set of network entities according to associated entity score; and storing data pertaining to the risk factor into a classification database.

As appropriate, the step of generating a risk factor further comprises generating an output list of potentially compromised network entities comprising each of the set of network entities communicating with the at least one suspect entity.

According to yet another aspect of the presently disclosed subject matter, there is provided a method for protecting a plurality of client networks from security threats using a crowdsourcing log analysis system, the system comprising at least one breach detection platform, a plurality of server machines associated with at least one of the plurality of client networks, each of the plurality of server machines operable to execute a product associated with a security product vendor and log associated information of at least one of a set of network entities into at least one log file, the system is connectable with the plurality of client networks via a communication network, the method for operating each of the plurality of client networks in an improved manner, the method comprising: connecting, via the communication network, to the at least one breach detection platform, the platform comprising at least one data repository connectable via a computer network; uploading, via the communication network, the at least one log file to the at least one breach detection platform; and receiving, via the communication network, a risk factor attribute associated with a detectable security event associated with the at least one of the set of network entities.

As appropriate, the method step of receiving a risk factor attribute, comprises receiving, via the communication network, at least one report comprising data pertaining to the risk factor attribute.

As appropriate, the method step of receiving a risk factor attribute, comprises receiving, via the communication network, at least one alert comprising data pertaining to the risk factor indicating a malicious activity associated with the at least one of the set of network entities.

Variously, the risk factor may be selected from a group consisting of: malicious, non-malicious, threatening, non-threatening, legitimate and suspicious.

BRIEF DESCRIPTION OF THE DRAWINGS

For a better understanding of the invention and to show how it may be carried into effect, reference will now be made, purely by way of example, to the accompanying drawings.

With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawing making apparent to those skilled in the art how the several forms of the invention may be embodied in practice. In discussion of the various figures described herein below, like numbers refer to like parts. The drawings are generally not to scale.

In the accompanying drawings:

FIG. 1 is a configuration diagram schematically representing an example of one possible configuration of selected elements of a system for crowdsourcing log analysis;

FIG. 2 is a configuration diagram schematically representing an example of another possible configuration of selected elements of a system for crowdsourcing log analysis of a business entity deployment comprising a plurality of content servers;

FIG. 3 is a configuration diagram schematically representing an example of yet another possible configuration of selected elements of a system for crowdsourcing log analysis of a plurality of business entity deployment comprising a plurality of content servers;

FIG. 4 is a block diagram schematically representing selected components of a possible back-end of the crowdsourcing log analysis system;

FIG. 5A is a flowchart representing the main processes in a method for performing the log-based crowdsourcing analysis;

FIG. 5B is a flowchart representing possible processes associated with the crowdsourcing log analysis logic unit for determining the risk factor associated with a suspect entity;

FIG. 5C is a flowchart representing the main processes in another method for the log-based crowdsourcing analysis;

FIG. 6 is a flowchart representing the steps of log based crowdsourcing analysis in a method for detecting suspicious security events, optionally using aggregated knowledge; and FIG. 7 is a flowchart representing the main processes in a method for performing the log-based crowdsourcing analysis from the client network side.

DETAILED DESCRIPTION OF THE INVENTION

Figure 1:
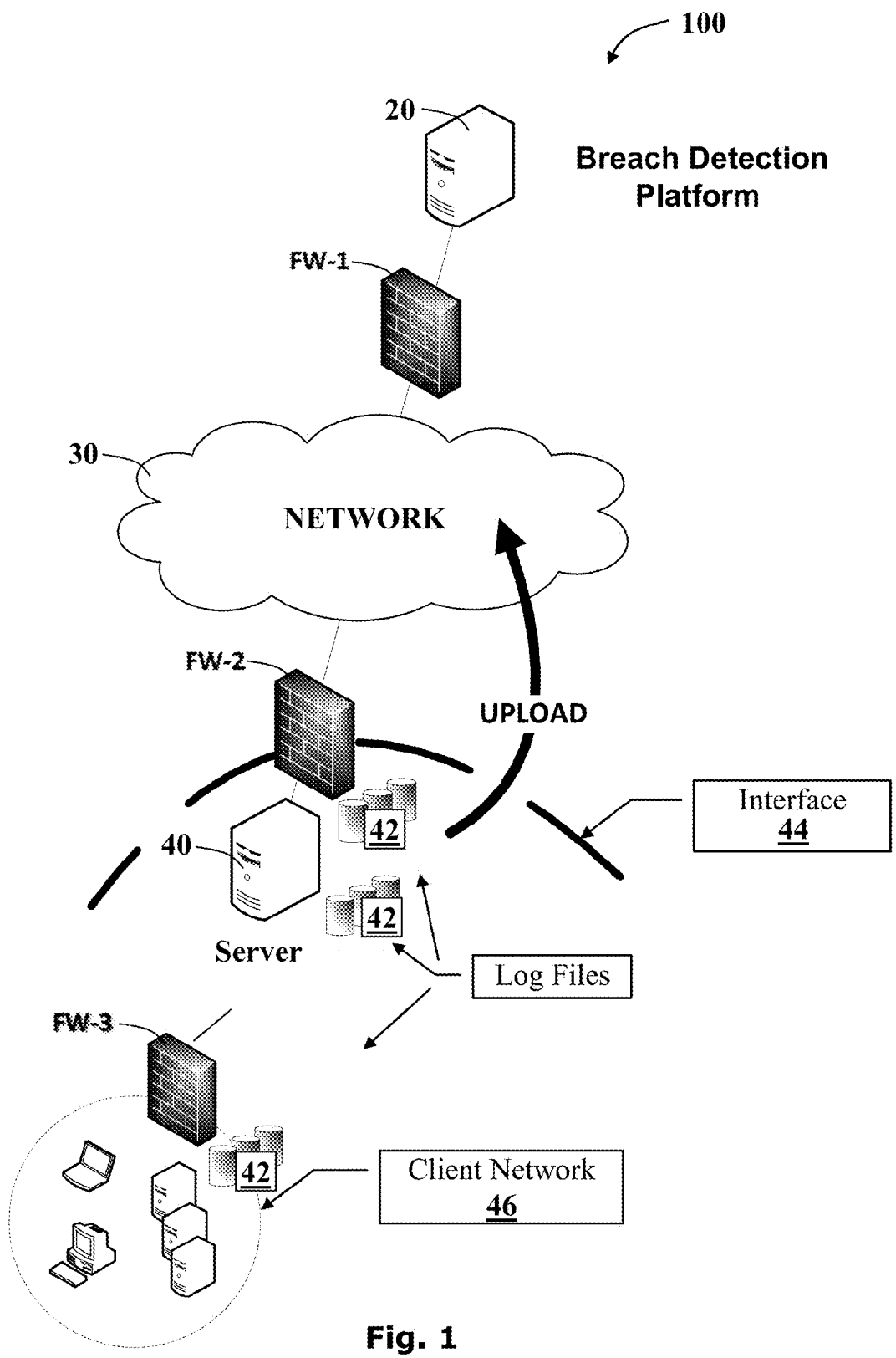

It is noted that the systems and methods of the disclosure herein may not be limited in their application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

Various embodiments of a crowdsourcing log analysis system and methods for protecting a plurality of client networks associated with a plurality of network entities from security threats are disclosed hereinafter. The system includes security threat management services which are operable to minimize business risks by providing a reporting and alerting mechanism upon detection of malware attack events. The system is configured to aggregate, normalize and analyze log information from multiple sources, identify malicious content, hostile servers and botnets. The system is further operable to utilize proprietary machine learning algorithms for behavioral detection and screening it with threat intelligence of additional data collected and cultivated, thus provide better security management and pinpointing corporate specific attacks. Using the system, users, such as network administrators and the like, may be capable of protecting or better sealing a domain against cyber penetration and leakage. Furthermore users may be able to identify cyber adversaries in real time and gain accurate visibility to possibly compromised business assets.

It is noted that generating a risk factor may further include providing an output list of potentially compromised network entities in a specific business entity/customer premises. Such an output list may include a list of organizational network entities (internal network entities) possibly communicating with at least one suspect entity.

As used herein, the term 'client networks' is associated with business entities and customers and may comprise various communication and computing devices optionally residing in public, private and protected networks.

As used herein, the term 'server' refers to a computer designed to process requests and deliver data to other (client) computers over a local network or the Internet. Servers are used to manage network resources such as a Web server, a Proxy Server, an FTP Server, a Firewall, a domain name server (DNS), a router, a gateway.

As used herein, the term 'log file' refers to any recording of data representing a list of activities (events) "logged" by a computer/server. It is noted that the term 'log file' may also related to a syslog which is a widely used standard of message logging, allowing to separate between the system generating the messages and the system string the messages.

Crowdsourcing:

Crowdsourcing is the collective intelligence of a group to complete business-related tasks. The term 'crowdsourcing' in the context of the current disclosure is associated with the aggregation of log files from a plurality of business units or customers and is further described hereinafter.

Using the Internet to solicit feedback from an active community of customers may reduce the amount of time spent by the individual. Specifically, for security analysis purposes, data input received, originating from a network of client networks representing a plurality of business units or customers, may enable detection of malware attacks in an improved manner. The data input comprising log file information generated by one or more types of security products of different vendors, may be received from a plurality of client networks representing a plurality of customers. Extracting and analyzing data from a variety of sources may enable detection of malware attacks which may otherwise be undetectable if a single site is only analyzed. Further, low profile malware attacks that are tough to detect in a single client network deployment may be detected by aggregating evidence from a plurality of organizations over time. Moreover, security attacks analyzed from a plurality of security vendor product sources may detect security attacks non-detectable by a security product associated with an individual security vendor only.

Accordingly, crowdsourcing log based analysis may be determined and associated with various spaces such as security product vendors, customer organization, organization market verticals (finance, health, transport etc.) and the like.

Where appropriate, a crowdsourcing log based analysis system may analyze a business unit or customer logs in massive parallel processing of log file batches several times a day to detect malicious communications within these logs. Consequentially, the system may alert confirmed breaching incidents of devices in the client network infected by malware and have communicated with Botnets or even ex-filtrated data.

It is noted that logs may be generated by a business unit or a customer using various security products installed on various client/server machines within a business unit client network deployment. Variously, the security product may be an organizational content server (Web servers, files servers, FTP servers, Anti-Virus servers and the like), a proxy, a next generation firewall, an Intrusion Prevention Systems (IPS), an Intrusion Detection Systems (IDS) and the like, each may be associated with various security vendors.

In particular and in contradistinction to the current system, malware protection systems known in the art, such as software or hardware installations or network configuration do not use crowdsourcing log based security analysis. Further, it will be demonstrated hereinafter, that the current system is capable of providing extensive coverage of many malware family types, regardless of their characteristics and methods of infection based upon log based analysis using a plurality of log files associated with various business units and customers and product vendors.

Reference is now made to FIG. 1, representing components of one possible configuration of selected elements of a system 100 for crowdsourcing log analysis. The log analysis system 100 comprises a breach detection platform 20 accessible via a firewall FW-1 and operable to perform log analysis using log files 42 associated with a content server 40, front-end firewall FW-2 and back-end firewall FW-3 uploaded via an interface 44 through the communication network 30. The log files 42 may be associated with a content server 40, front-end firewall FW-2 and back-end firewall FW-3. The content server 40 may be connectable through a client network and operable to connect with the public network, such as the internet or 'the Web', may be accessed by via a front-end firewall FW-2. The content server 40 may have further access to an internal client network 46. Optionally, access may be limited to various regions of the internal client network 46 by a back-end firewall FW-3.

It is noted that the system 100 may represent a partial network subset of a business entity or a customer.

In this embodiment, the content server 40 may be configured to function variously according to the business entity or customer needs. As such the content server 40 may function as an internet server, a file server, a communication server and the like. As such, the log files may contain log information according to the security product installed on the specific server machine. Thus, the log information may relate to the classification of the network traffic inspected through the server machine, for example, to allow analyzing the traffic as malicious or non-threatening.

It is further noted that each security product vendor may have particular capabilities to detect various attacks derived from different information collected by the product vendor and may further use different technologies. Further, when a communication event is classified as malicious, the product's log file may contain information associated with decisions whether to block or allow the communication through; reason for the classification, category of malware and risk level; type of malware and its objective; identity of the host that the malware tried communicating with and more. The format of each product's log file may be peculiar to that product.

Additionally or alternatively, the security product may decide to block communication due to a policy violation. As appropriate, the data pertained to this security event may be recorded and logged in the log file, including the blocking event details and the applicable reasons.

It is particularly noted that the crowdsourcing analysis of log files generated by different security product vendors, may contribute substantially to obtaining enhanced detection capabilities. For example, creating a group of threat indicators may be used for security event detection based upon a plurality of sub-group extracted from log files of each security product, such that a sub-group may be created by analyzing all the logs generated by a certain type of a product. Furthermore, a voting algorithm may be created for voting between the various vendor indicators' to reduce disagreements and to reduce the probability of reporting false positive incidents. The voting algorithm may be assigned a weight value according to a confidence level per security product vendor derived from measuring percentage of false positives. Additionally or alternatively, the voting algorithm may apply machine learning algorithms such as Random Forests, Support Vectors Machine (SVM), naive Bayes classifiers and the like.

Optionally, the voting algorithm may be generated automatically at the occurrence of a security event.

Moreover, the crowdsourcing analysis may be operable to reflect and provide customers with a benchmark tool for comparing security products owned by customer and other security products. Additionally, the use of combined malicious traffic reported by different security vendors may allow generalization of detection patterns for malware. For example, by creating patterns of malware URLs, thus, enabling finding out more unknown incidents of malware. Where appropriate, the analysis may use log file information, such as policy decisions to block traffic, in order to help additional tools that flagged a host as suspicious but not confirmed to convey malicious communications.

Figure 2:
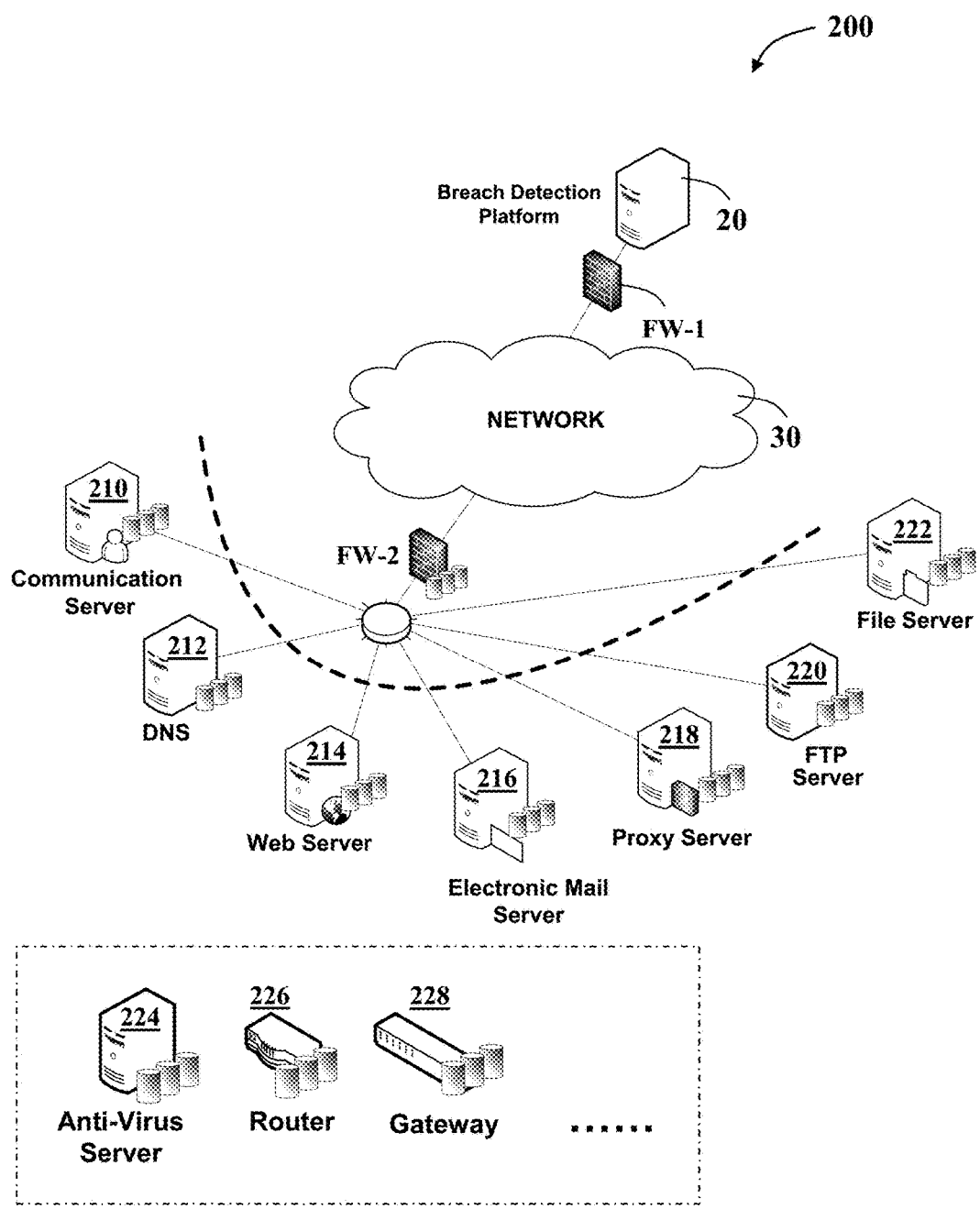

Reference is now made to FIG. 2, representing the major components of another possible configuration of selected elements of a system 200 for crowdsourcing log analysis using log information from a various server machines, operable under the umbrella of a client network representing a possible organization/institute/company and the like.

The log analysis system 200 comprises a breach detection platform 20 accessible via the firewall FW-1 and operable to perform log analysis using a plurality of log files, each of the plurality of the log files may be associated with one or more of a plurality of content server machines. Further, the plurality of organizational content server machines may be connectable to the network via a front-end firewall FW-2 having associated logging capabilities.

Such organizational content servers may include, but not limited to, a Communication Server 210, a Domain Name Server (DNS) 212, a Web Server 214, an Electronic Mail Server 216, a Proxy Server 218, an FTP Server 220, a File Server 222 and the like. Optionally, other devices may be part of the client network logging relevant log information, such as an Anti-Virus Server 224, a Router 226, a Gateway 228 and more.

Each content server machine may be connectable via an internal client network. Optionally, more than one server machine may be associated with an internal client network, where each client network may represent an organizational sub-section or a department.

Optionally, various internal client network may be further protected behind an internal firewall (not shown).

In this embodiment, it is noted that the plurality of content servers may be associated with a plurality of client networks, each performing client functions or representing various sub-organization within a customer network deployment.

Figure 3:
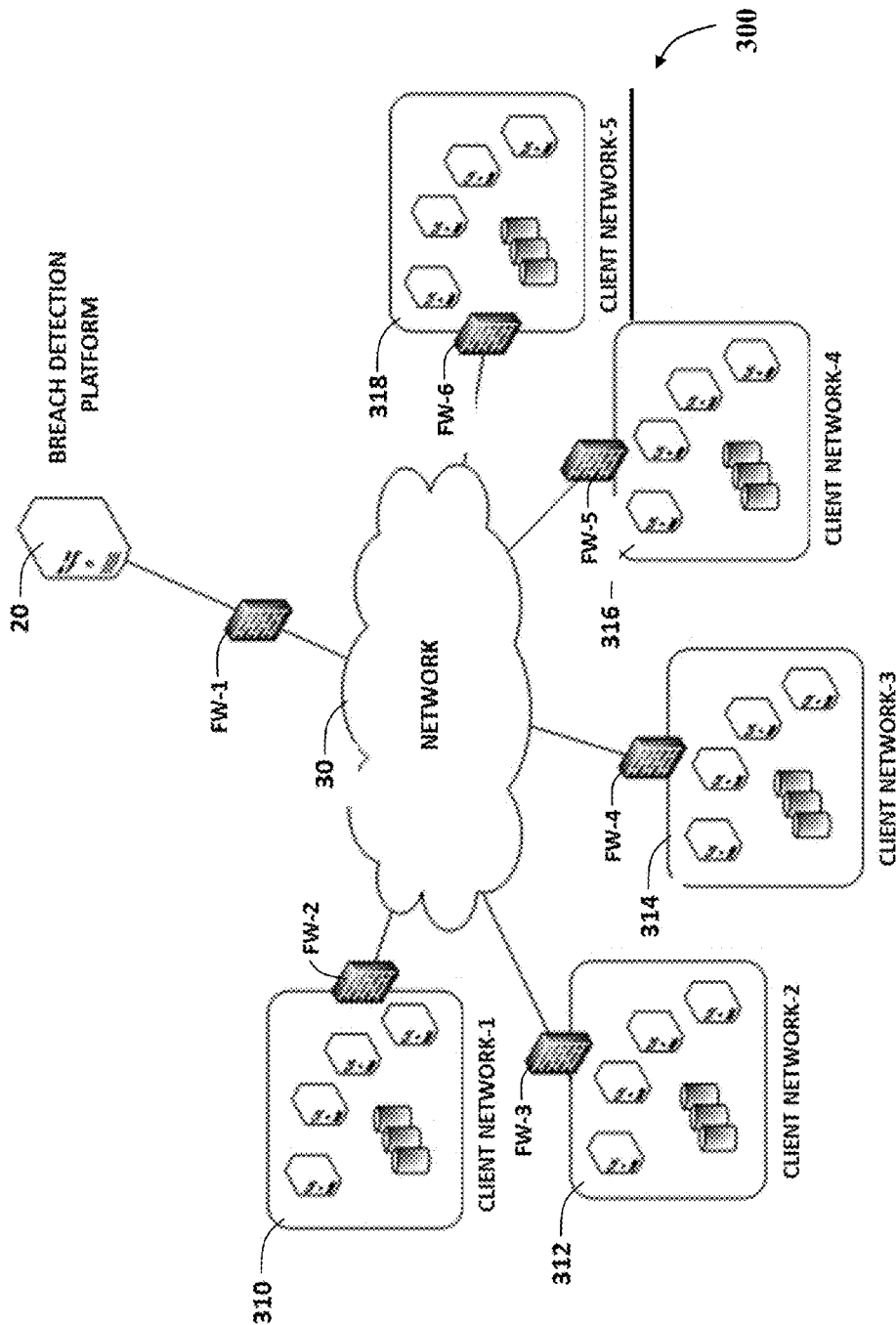

Reference is now made to FIG. 3, representing yet another possible configuration of selected elements of a system 300 for crowdsourcing log analysis. The system spans over a plurality of client networks, where each network may represent a different organization or customer.

In this embodiment, the log analysis system 300 comprises a breach detection platform 20 accessible via the firewall FW-1 and operable to perform log analysis using a plurality of log files, each of the plurality of the log files may be associated with one or more of a plurality of content server machines of client networks associated with various business entities or customers and may have a format peculiar to it. Further, the log analysis system 300 is operable to retrieve log files from a plurality of client networks and further provide reporting and alerting mechanisms.

In this embodiment, the log analysis system 300 comprises a plurality of client networks, each may represent a separate organization or a department in a specific commercial entity. The plurality of client networks 310 through 318 may each be protected by a front-end firewall, such as the front-end firewall FW-2 protecting client network 310.

As described hereinabove, log files are retrieved from various client networks representing different business entities or customers and log information of a variety of security product associated with a plurality of security product vendors.

It is noted that malware attacks are characterized by the frequent appearance of new types of attacks. For example, new types of attacks may be characterized by a type unknown before, of malware and/or new command and control hosts that malware communicates with. When the log analysis system detects a new type of attack in a log file of a client network associated with, say, business entity A, the system may use this information to better detect or prevent attacks in another client network associated with another business entity or customer.

For example, the characteristics of a detected security attack/malicious communication associated with a business entity may be added to a profiler database to enable blocking such malicious communication at some point of time in another business entity.

Additionally, a security event in a client network is possibly detectable based upon similarities to such a security event in another client network. Further, client networks A, B and C are attacked, thus statistical indicators may be derived by aggregating data from these client networks to analyze and pin-point to a possible malicious activity.

It is noted that, as stated hereinabove, the crowdsourcing analysis may refer to market verticals. The market verticals, evidently are suffering malware attacks jointly in specific times. Thus, the log based analysis is operable to provide statistical indicators for each vertical increasing the probability of detection and further reducing false positives.

For example, security events in a plurality of client networks A, B and C of a specific may trigger generating statistical indicators derived from aggregating data from these client networks to enable pin-pointing to a malicious activity. A similar security event in another client network of the same vertical may be prevented by deriving thresholds specific to this vertical based upon client networks A, B and C's analysis. The use of specific thresholds per vertical may reduce the probability of reporting false positive incidents. For vertical X, for example an average of 100 communications a day from a client to hosts in a location is non-threatening, but for vertical Y, over 10 times a day is a strong indicator of a malicious activity in another location.

It is further noted that security event incidents may be reported in numerous ways such as a web portal, a web API, through dedicated connectors into different Security Information and Event Management (SIEMs), a dedicated management application (Splunk at www.splunk.com, for example) and the like.

Figure 4:
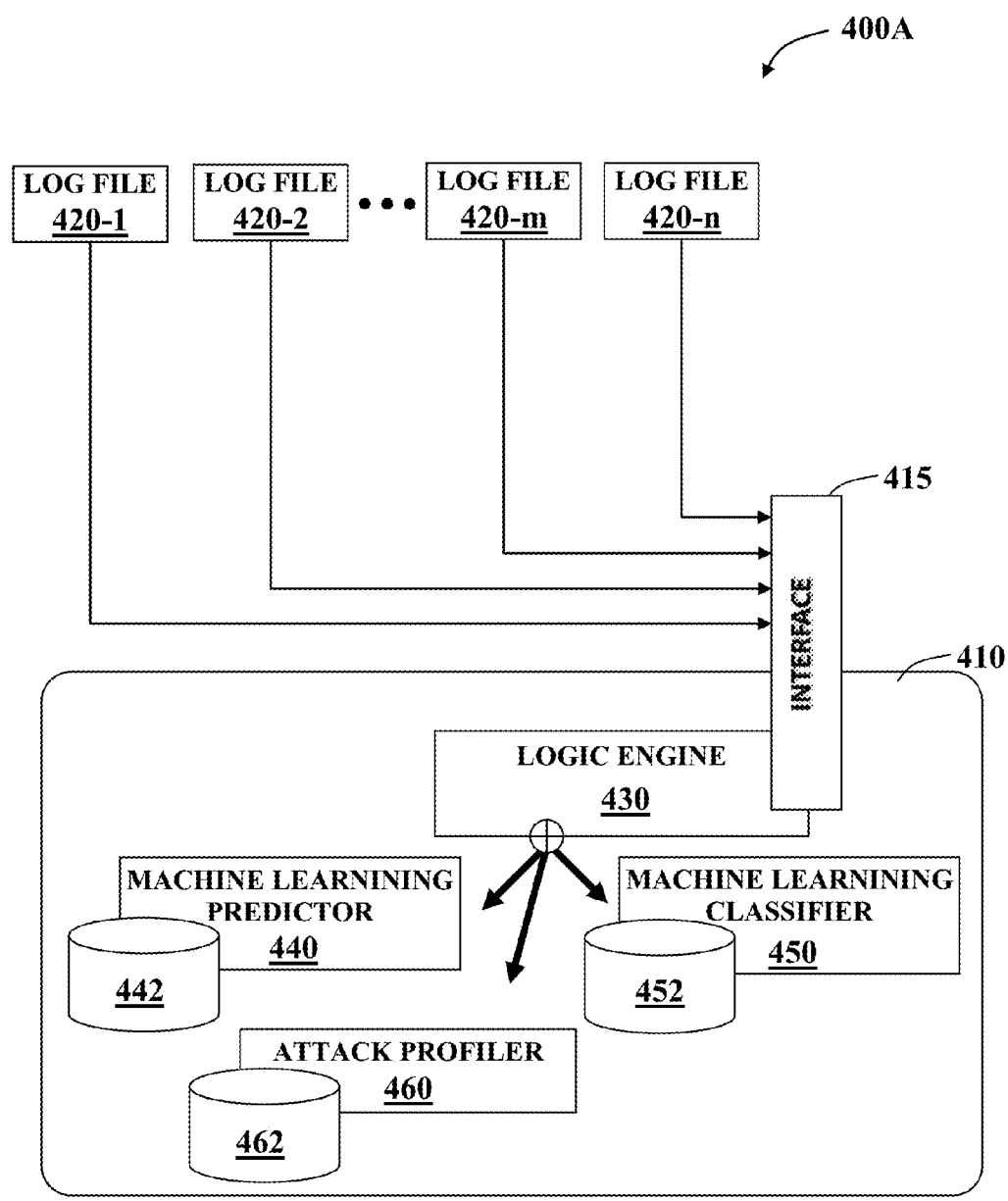

Reference is now made to FIG. 4A, a block diagram schematically representing selected components of a possible back-end 400A of the crowdsourcing log analysis system.

The back-end of the crowdsourcing log analysis system 400A may include a breach detection analyzer 410 reading a set of uploaded log files 420-1 through to 420-m through an interface 415. The breach detection analyzer 410 further comprising a logic engine 430 operable to manage the platform logic; a machine learning predictor 440 operable to perform the analysis determining the risk factor of at least one suspect entity related event associated with an entity categorization database 442; a machine learning classifier 450 operable to assign the risk factor attribute to at least one suspect entity and further associated with an entity classification database 452; and an attack profiler 460 associated with an attack profiler database 462.

In this embodiment, the logic engine 430 is operable to manage the platform logic associated with retrieving log files from the various client networks, collecting data pertaining to the plurality of network entities, normalizing log records which have different formats into a standard format and storing the normalized data into at least one entity record of the system's data repository, building the learning process, performing analysis, determining the entity score associated with the network entities and generating output of the risk factor, accordingly. The logic engine, for example, may use the entity score associated with an entity as the output of the machine learning predictor 440 and further serve as the input for the machine learning classifier 450, to enable determining the risk factor.

The machine learning predictor 440 may be operable to determine the risk factor associated with a specific suspect entity in terms of an entity associated score determining the likelihood of the entity to be malicious. The machine learning predictor 440 is operable to build knowledge that mainly correlates between assessment applied by a specific security product vendor for a single attribute or a combination of attributes. As appropriate, the knowledge as stored in the system repository may be used for associating scores to new network entities. Further, the knowledge for each vendor may be represented differently, affecting the resulting analysis (as detailed in the flow chart FIG. 5C).

It is noted that standard learning algorithms may be applied such as Random Forests, Support Vectors Machine (SVM) and naive Bayes classifiers.

The machine learning classifier 450 is operable to perform entity network classification, to determine the risk factor associated with at least one suspect entity specifying if it is malicious or non-malicious (non-threatening). The classification may generate an automated decision for determining the risk factor and may be associated with the entity computed score, which may for example, use further comparisons to a threshold value. Where appropriate, the classification may be determined by using additional information to generate a decision, using characteristics such as behavioral characteristics extracted from the logs or retrieval of external information associated with the suspect entity. Optionally, the machine learning classifier may use a wider range of the suspect entity features.

Additionally or alternatively, the machine learning classifier 450 may include a manual review of professional experts examining/researching a suspect entity upon certain conditions to determine its associated classification.

It is further noted that the risk factor attribute of each of the plurality of network entities may be stored in the associated entity classification database 452. Additionally or alternatively, the system may be operable to generate an output report or output alert comprising data pertaining to the risk factor attribute associated with each the plurality of network entities. Optionally, the output report or the output alert may be configured to be transmitted via the communication network to any of the client networks (FIG. 3, 310 for example).

The attack profiler 460 is operable to manage communication attacks and provide defensive means to client networks that may possibly be affected from such communication attack detected in another client network. The attack profiler 460 may be configured to manage the crowdsourced attack profile database 462 and adding attack characteristics to the database. For example, a detected command and control host identities, in one business unit, may be added and stored in the profile database as part of a host blacklist. Thus, the profile database information may be applied to block communication to any of the blacklisted hosts in another organization. Furthermore, say for example, attacks are detected in business units A, B and C based upon log analysis and stored in the profile database. Accordingly, statistical indicators may be derived from the aggregated data, to help preventing malicious activities in business unit D.

The system repository may be a storage unit comprising a plurality of databases such as 442, 452 and 452 provided to store the information collected by the breach detection platform 410. The storage unit may be used to store data in various forms, filtered or unfiltered. Data forms may be records of network entities, vendor specific assessments, customer specific information, classification of suspicious server machines, classified raw traffic, bot-traffic patterns indicative of bot-infected assets, classified traffic, filtered traffic or the like. For example, traffic may be classified in accordance with 'client addresses' representing corporate assets to be protected, 'bot addresses' representing criminal servers, known bots, traffic dates, or any other classification scheme optionally defined by a user.

It is noted that the system may be operable of employing unlimited repository storage, thus the system may be configured to analyze the plurality of client networks' data log information in massive parallel processing batches several times a day. Accordingly, the system may be operable to track down hidden security events such as stealthy and targeted malware attacks existing for long durations.

Figure 5A:
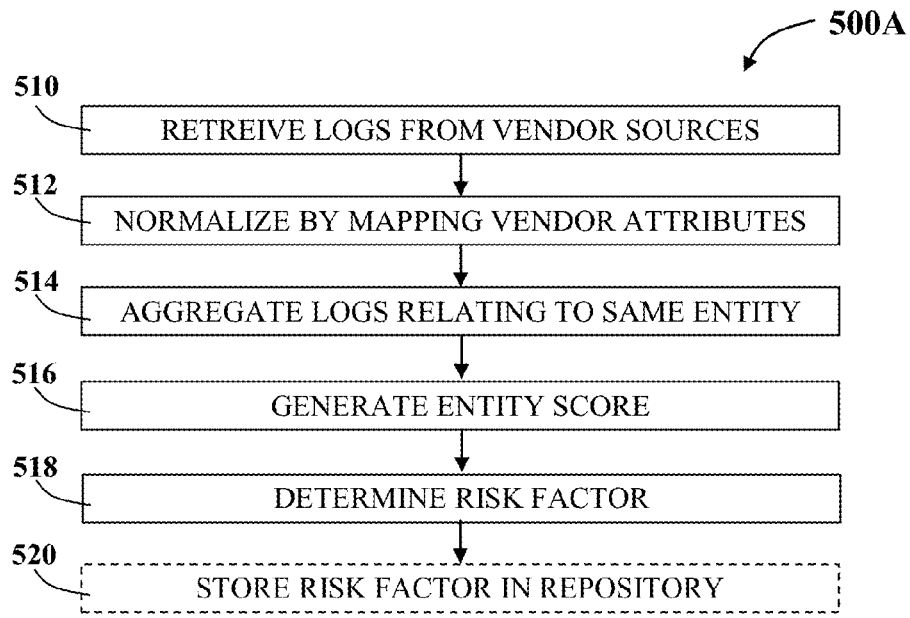

Reference is now made to the flowchart of FIG. 5A, illustrating a possible method 500A representing the main steps for performing vendor crowdsourcing analysis to detect possible malicious client network attacks based upon log file information. The method 500A may use input from a server log file information associated with a client network and categorization/classification definition stored in a repository. The method 500A may read a plurality of third-party assessment attributes, stored as log records in log files associated with security product installed on servers, each may be associated with a client network (as described in FIG. 5B hereinafter).

Optionally, if additional internal/external sources are available, the method may use such information, possibly associated with organizations, various security product vendors, organization market verticals (finance, health, transportation etc.) and the like.

It is noted that, as illustrated hereinafter, the method may be configured to run appropriate software installed on one of its constituent server devices.

According to the method, the process of log based crowdsourcing analysis includes retrieving log files from various log sources—step 510, where the log files may be associated with diverse product vendors and with various customers. It is noted that the retrieved log files may be structured in various third-party formats (TPF).

Accordingly, the TPF log record categorization fields may be normalized by mapping existing TPF log record fields—step 512 into a common terminology structure. The process further includes aggregating each log record information relating to the same entity and associating the log record to the appropriate entity record—step 514; generating entity score according to log analysis—step 516 associated with the suspect entity; and determining the risk factor according to the entity score—step 518 to specify if the entity is malicious (threatening), non-malicious (non-threatening) or suspicious; optionally storing the risk factor in the entity classification repository—step 520.

It is noted that optionally, a report or an alert may be generated based upon the entity reputation score and transmitted, based upon configuration, via the communication network.

It is further noted that the synthesis of at least a plurality of third-party assessment attributes, optionally with other internal/external sources may enable detection of malware attacks that could not be detected using information of a single business unit or a customer, nor if associated with a single security product. Further more, the synthesis may enable detection of low profile attacks based upon aggregating evidence from multiple sources over time.

Figure 5B:
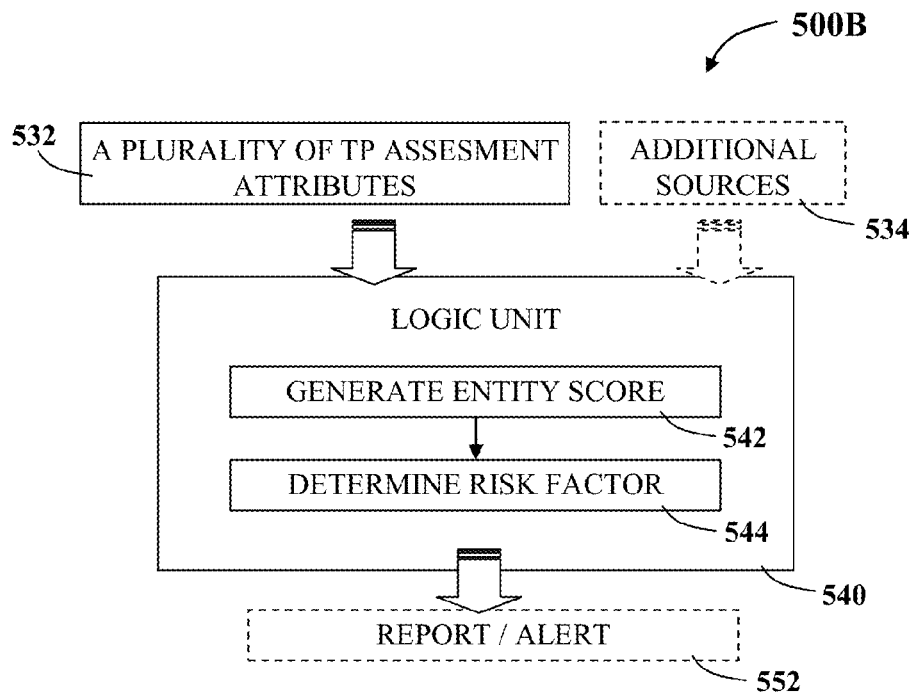

Reference is now made to the flowchart of FIG. 5B, illustrating possible method 500B associated with the crowdsourcing log analysis logic unit for determining the risk factor associated with a suspect entity.

According to the method, the process of crowdsourcing includes reading a plurality of third-party assessment attributes—step 532, into the logic unit 540; additionally, the method 500B includes reading more information from internal or external sources in an improved manner—step 534; internally, the logic unit is generating an associated entity score—step 542; and further determining the risk factor to the suspect entity—step 544. Optionally, the logic unit is outputting an associated report or transmitting an alert—step 552.

Figure 5C:
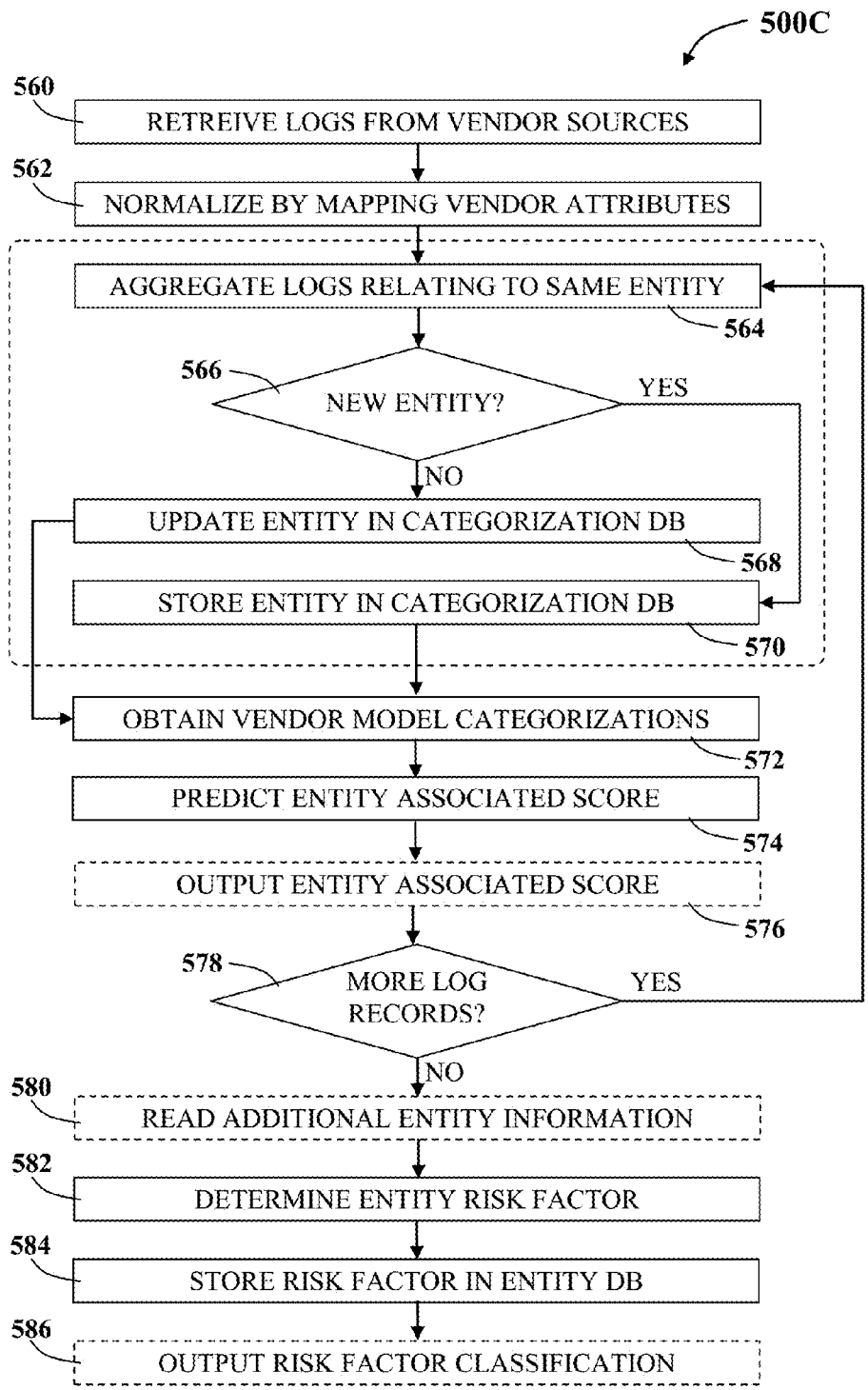

Reference is now made to the flowchart of FIG. 5C, illustrating a possible method 500C representing the main steps for performing vendor crowdsourcing log analysis to detect possible malicious client network attacks based upon log file information. The method 500C may use input from a plurality of servers, each associated with a client network log file information and categorization/classification definition stored in a repository, and optionally may further read external entity information. The method 500C may output an entity associated score representing the analysis result of the log records and the accumulated entity knowledge. Additionally or alternatively, the method 500C may output a classification of the entities, typically in a form of malicious or non-malicious classification.

It is noted that, as illustrated hereinafter, the method may be configured to run appropriate software installed on one of its constituent server devices.

According to the method, the process of crowdsourcing includes retrieving log files from various log sources—step 560, where the log files may be associated with diverse product vendors and with various customers and with various TPF structures; normalizing each TPF log record of the log file categorization fields by mapping existing log record fields—step 562; and aggregating each log record information relating to the same entity and associating the log record to the entity record—step 564; if the currently analyzed log record information is associated with an existing entity in the categorization repository—step 566; then, updating the log record information with the entity in the categorization repository—step 568; else, storing the log information in a new entity in the categorization repository—step 570;

The method further includes obtaining the vendor model categorizations—step 572; predicting, based upon the log analysis, the score of the associated entity—step 574; and optionally outputting the entity score—step 576.

If the log file includes additional log records—step 578, then repeating step of aggregating; otherwise, reading, optionally, external entity information—step 580; determining entity risk factor classification—step 582 based upon entity score; and storing the risk factor classification in the entity classification repository—step 584.

Optionally, the method may include a step of outputting the entity risk factor classification—step 586.

The process of crowdsourcing analysis requires three initial steps to form the basis of the analysis—retrieving the log file from various sources, normalizing the log file information and aggregating the information for the relevant entities.

Retrieving:

The step of retrieving is the step of obtaining the log files, possibly from numerous log sources, uploaded onto the cloud based breach detection platform. The log files may be associated with diverse product vendors and linked with various customers. Variously, the log files may include log records having standard fields.

Optionally, the log records may include categorization fields added by a specific vendor. Such categorization fields in gateway logs, for example, may include domain category, risk level, action (such as allow or deny) and the like. It is noted that vendor categorization fields may differ and are likely to be vendor specific in terms of syntax and semantic, thus requiring normalization. Optionally, dedicated record fields may identify the vendor and the customer.

Normalizing:

As used herein, the term 'normalization' refers to mapping varying terminology of a log record message parts from different log sources to read the same format, such that the analysis, reports and statistics may be derived from a heterogeneous environment of security vendors.

The step of normalizing is the step of standardizing the TPF log records of different vendors/customers having various log file categorization fields by mapping existing TPF log record fields into a unified set of normalized fields. The set of normalized log records are not specific to a particular vendor, in terms of field name and type, thus providing a common denominator for comparison and analysis.

Variously, other field values may further be normalized. For example, gateway logs may include possible actions such as 'permit' and 'block', and upon normalization 'permit' becomes 'allow' and 'block' becomes 'deny'.

Aggregating:

The step of aggregating is the step of gathering and collecting information over time, from log records related to the same entity and which is associated with an entity record. As appropriate, the entity records representing the accumulate information over time may be stored in a repository, enabling to use machine learning algorithms to build the system knowledge necessary for risk factor analysis. The repository may be represented as in the FIG. 4 (entity categorization database, item 442). The aggregation step might insert new entities into the repository if the entity does not exist, or update an existing entity.

An entity, in this context may be a thing about which data may be stored. For example, if logs are gateway logs, then the context of an entity may refer to a destination host, a URL pattern, a user agent and the like. The entity record may include or may be associated with a summary of categorization attributes of each vendor, based on log records related to the product vendor.

It is noted that logs may be associated to communications from a network entity to an external host in the internet.

Accordingly, in the case of a host entity, assuming log records with a destination host 'h1' received from gateways of vendors A, B, C, and D. As a result of the aggregation step, host 'h1' may be associated with the following categorization attributes:

Vendor A: Domain Category: Botnet; Risk: High; Action: Block
Vendor B: Domain Category: Malnet; Risk: NA; Action: Allow
Vendor C: Domain Category: Botnet; Risk: NA; Action: Allow
Vendor D: Domain Category: Unknown; Risk: NA; Action: Allow As used herein, the term 'botnet' refers to a group of computers running a computer application controlled and manipulated only by the owner or the software source. The botnet may refer to a legitimate network of several computers that share program processing amongst them but may be used for malicious purposes.

As used herein, the term 'malnet' refers to malware networks, presenting a serious internet security threats because of their scope and the difficulty in uncovering them. As they are prone to last beyond several attacks, they enable cybercriminals to adapt to new vulnerabilities in web structures, and launch dynamic attacks over and over again.

Additionally or alternatively, the categorization attributes of an entity may be related to a the source of the logs—the customer. This may further contribute in the analysis, if the categorization attributes are customer specific.

It is noted that the term "vendor" may be used as the classification source of a log record.

Predicting:

The step of predicting is the step of determining the probability of an entity to be malicious or non-malicious, based on predicting the associated score of an entity. When the entity is representing a host, the entity associated score typically relates to whether or not the host is C2 (Comand and Control, C&C). The associated score may be a Boolean where '0' stands for being non-malicious and '1' stands for being malicious. Optionally, the associated score may be numeric representing a number between 0 to 1 indicating a probability value, or may further be represented by a confidence level, as described hereinafter.

It is noted that the prediction may use the logic of a "Vendors Model" based upon deductible vendor knowledge or emprical knowledge based upon vendor learning algorithms (see FIG. 3). The knowledge mainly relates to the correlation between categorizations performed by a product vendor for a single attribute or a combination of a set of attributes, and the classification of the entity as malicious or non-malicious.

It is further noted that the assessment of a product vendor may not always be correct and the average accuracy of the assessment may be different from one product vendor to another product vendor.

It is also noted that the knowledge on product vendor categorization may be represented in various ways and this may affect the way the prediction is performed.

Classifying:

The step of classifying is the step of determining the classification of an entity as malicious or non-malicious. This step may be a simplified automated decision relying on the associated score compared to a threshold value, for example. Additionally or alternatively, the classifying step may use additional information to reach a decision. For example, behavioral characteristics may be extracted from the log records or further use external entity information. Furthermore, a machine learner classifier may be used to allow consideration of a wider range of entity features.

Moreover, the step of classifying may include manual review of experts examining or researching an entity when certain conditions are held in order to determine its classification.

It is noted that in some implementations, a machine learning predictor (predicting step) and a machine learning predictor that considers additional features (classification step) may be unified into one predictor machine analyzing the categorization attributes combined with other features.

Where appropriate, the classification of an entity may be stored in an 'Entity Classification' repository. Optionally, the classification of the entity may be an output of the classifying process.

The method as defined herein may be used as a futuristic detection and protection method superior even to zero-day attacks recognition. The analysis performed on the traffic may be used to identify potential attacks yet to be executed by criminal servers. The criminal servers may be in a latent state, but the analysis of traffic may identify them before they launch their attacks.

Figure 6:
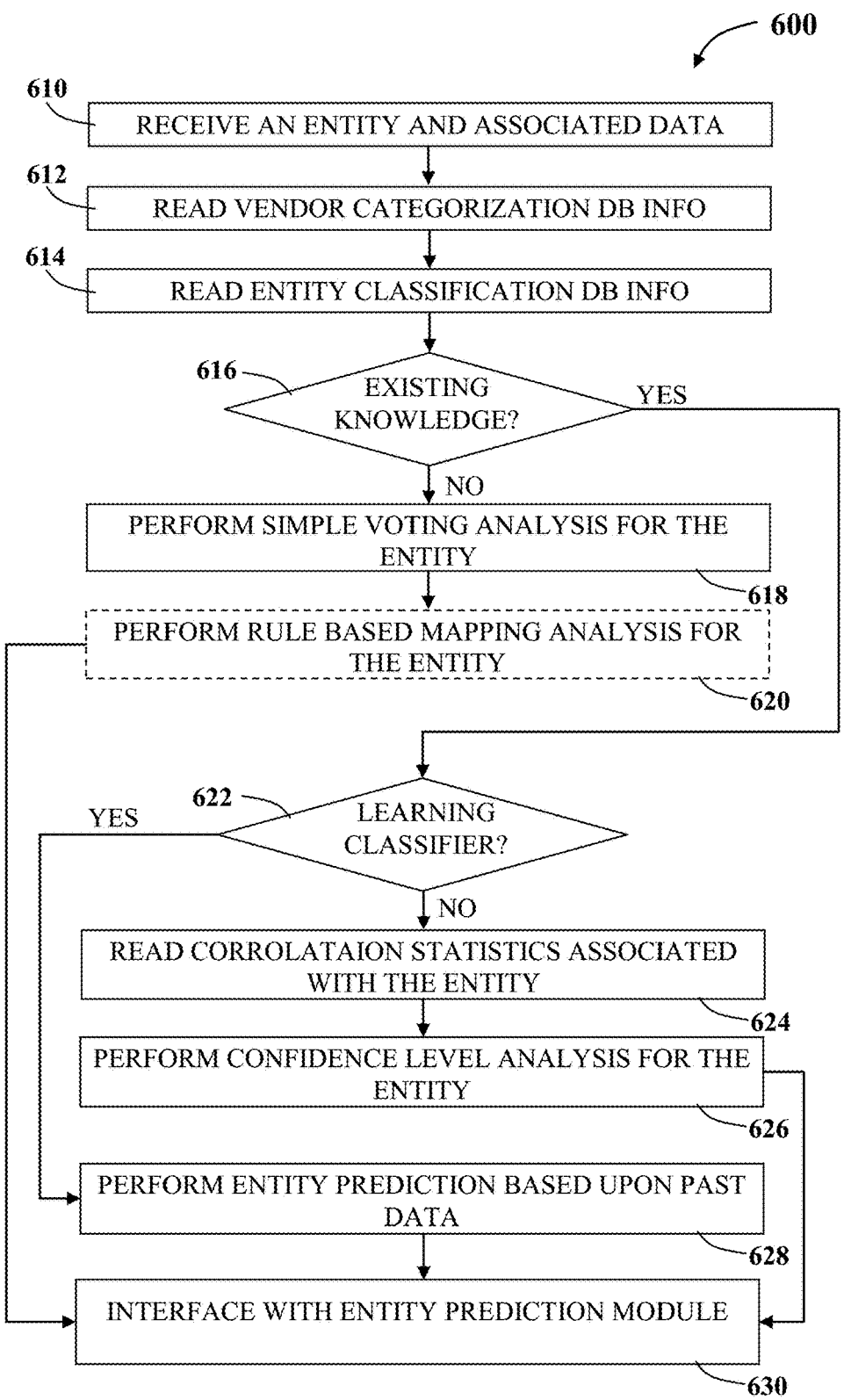

Reference is now made to the flowchart of FIG. 6 representing an assessment mechanism 600 combining a learning vendor categorization module generating a vendor model structure to allow further interfacing with the entity prediction module.

The categorization mechanism 600 comprises a data repository 610 comprising two databases; an entity classification database 612 and a vendor categorization database 614. The assessment mechanism further comprising a learning vendor categorization module 620 configured to generate a vendors model 630 based upon data received from the data repository 610 related to vendor categorizations and entity classifications. The vendor model is further configured to provide output to an interfacing with the entity prediction prediction module 650.

Accordingly, the vendor model 630 may further comprise a simple voting sub-module 632; a rule mapping sub-module 634; a confidence level sub-module 636; and a weight based voting sub-module 638. Additionally or alternatively, the vendor model 630 comprises a machine learning classifier 640 operable to perform mapping of the vendor categories to features.

The simple voting sub-module 632 is operable as the default option, if there is no a-priori knowledge on vendors. The prediction may be simple voting, such that the score may be the number of vendors assessing the entity as malicious.

Additionally or alternatively, the rule mapping sub-module 634 may be operable such that the result is a rule, based upon mapping the simple voting result to some known score.

Where appropriate, the confidence level sub-module 636 may be operable providing a more accurate option analyzing the correlation between assessment values of the different product vendors and the classification of an entity as malicious entity. This analysis reflects the confidence assigned to the categorization of a product vendor based on historic data.

For example, an entity representing a host, then determining the likelihood of the entity to be a C2 entity based upon its score may use information such as:
  Vendor A is right 80% of the times in categorizing the domain of a host as a 'botnet' (C2 entity), while Vendor B was right only 25% of the times, or alternatively:
  Vendor A is right 5% of the times in categorizing the domain of a host as 'malnet'

The prediction in this case may be performed based on weight based voting between the various vendors assessing the host being analyzed. The relevant weights relate to the confidence rate measured for the categorization of the vendors associated with the specific host.

Accordingly, the voting may use a mathematical function such as the sum of confidence rates of the domain categories of the associated product vendors. It is noted that for the mathematical sum function the score may be unbound, implying that higher values indicate higher probabilities that the host is a C2 entity. Optionally, other mathematical functions may be used and may keep the score in the range between 0 and 1, for example.

Additionally or alternatively, the 'Vendors Model' may be operable is a machine learning classification model built based on historic examples of malicious and legitimate entities, and their vendor assessment.

The prediction is performed by using the model, considering the assessment values provided by the vendors as features of the entity. The prediction result could be classification (malicious/legitimate) or a score between 0 and 1 (e.g., probability of being malicious).

The prediction result (the entity associated score) is an optional output of the method. The entity associated score is typically an input for the next step that determines the entity classification.

Figure 7:
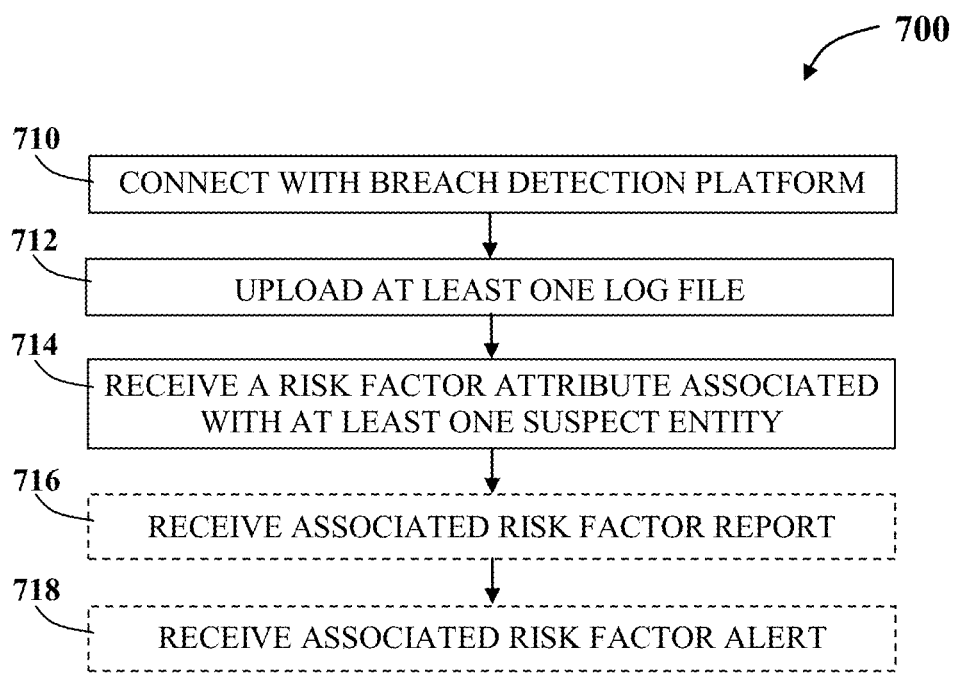

Reference is now made to the flowchart of FIG. 7, representing the main processes in a method 700 associated with the client network side to enable performing the log-based crowdsourcing analysis and receive analysis outputs.

Accordingly, the method 700 includes connecting with the breach detection platform, via the communication network (FIG. 1, 30)—step 710; upload a plurality of log files from a plurality of client communication networks (FIG. 3, 310 for example), each representing a business entity or a customer—step 712, via the communication network, onto the breach detection platform (FIG. 1, 20); and receiving a risk factor attribute associated with at least one suspect entity—step 714, where the security event is associated with at least one of the plurality of network entities.

Optionally, the method 700 may further include receiving a risk factor output report—step 716; and receiving a risk factor output alert—step 718; where the output report and output alert are data pertaining to the risk factor attribute and the specific entity which is suspected, depending upon the urgency of the security breaching event detected.

It is noted that the risk factor attribute may classified to be malicious, non-malicious, threatening, non-threatening, legitimate and suspicious.

The log based data aggregated and presented by the system may include a variety of data relating to threats and vulnerabilities such as current and future IP addresses of the criminal server, current and future URLs of the criminal server, current and future domain names used by the criminal server, geographical locations of the security threat; frequencies and identities of vulnerabilities exploited by the malicious software, time stamps and such like.

Thus the disclosure hereinabove presents various methods and systems which may be used to protect networks against cyber threats, particularly from criminal servers, botnets and the like. The scope of the present invention is defined by the appended claims and includes both combinations and sub combinations of the various features described hereinabove as well as variations and modifications thereof, which would occur to persons skilled in the art upon reading the foregoing description.

The methods and systems described hereinabove may be deployed in part or in whole through a machine or device that executes computer software, program codes, and/or instructions on a processor. The processor may be part of a server, client, network infrastructure, mobile computing platform, stationary computing platform, or other computing platform. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The scope of the disclosed embodiments may be defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A crowdsourcing log analysis system for protecting a plurality of client networks from security threats, each of said plurality of client networks is associated with a set of network entities, said crowdsourcing log analysis system comprising:
a plurality of server machines, each of said plurality of server machines comprising logic configured to execute a third-party security product and log associated third-party assessment attributes of at least one suspect entity into at least one log file; and
each of said plurality of client networks comprising logic configured to connect with at least one of said plurality of server machines to receive at least one log file;
at least one breach detection platform comprising logic configured to receive a plurality of log files from said plurality of client networks via a communication network, said at least one log file being one of the plurality of log files;
wherein said crowdsourcing log analysis system is configured to generate a risk factor for said at least one suspect entity based upon at least a plurality of said third party assessment attributes; and
wherein said crowdsourcing log analysis system causes blocking of communication for said at least one suspect entity based upon at least said risk factor being indicative of said at least one suspect network entity being a security threat.

2. The crowdsourcing log analysis system of claim 1, wherein said at least one suspect entity is selected from a group consisting of: an external network entity, an internal network entity, a URL pattern, a destination host, a user agent and combinations thereof.

3. The crowdsourcing log analysis system of claim 1, wherein said at least one breach detection platform is configured to collect data pertaining to said set of network entities, to normalize said data and to store the normalized data into at least one entity record of a data repository.

4. The crowdsourcing log analysis system of claim 1, wherein said risk factor is selected from a group consisting of: malicious, non-malicious, threatening, non-threatening, legitimate and suspicious.

5. The crowdsourcing log analysis system of claim 1, wherein said at least one breach detection platform is further configured to generate an output report comprising data pertaining to the risk factor associated with said at least one suspect entity.

6. The crowdsourcing log analysis system of claim 5, wherein said output report is configured to be transmitted via said communication network to one of said plurality of client networks.

7. The crowdsourcing log analysis system of claim 1, wherein said at least one breach detection platform is further configured to generate an alert associated with a detectable security incident associated with one of said set of network entities, said alert is configured to be transmitted via said communication network.

8. A method for protecting a plurality of client networks from security threats based on a generated risk factor, each of said plurality of client networks is associated with a set of network entities, for use in a system comprising at least one breach detection platform and a plurality of server machines associated with said plurality of client networks, each of said plurality of server machines configured to execute at least one third-party security product and log associated information into at least one log file, said at least one breach detection platform and said plurality of server machines being connected via a communication network, said method for operating said at least one breach detection platform in an improved manner, the method comprising:
retrieving, via said communication network, a plurality of log files from said plurality of client networks, each of said plurality of log files comprising at least one log record structured in a plurality of a third-party formats (TPF);
normalizing each of said plurality of log files by mapping a plurality of assessment attributes pertaining to at least one suspect entity from said plurality of third party formats into a standard format of at least one entity record;
aggregating said plurality of normalized log files into at least one data repository;
generating a risk factor for said at least one suspect entity based on said aggregated, normalized log files, said risk factor being characterized by an entity score; and
blocking of communication for said at least one suspect entity based upon at least said risk factor being indicative of said at least one network entity being a security threat.

9. The method of claim 8, wherein said at least one suspect entity is selected from a group consisting of: an external network entity, an internal network entity, a URL pattern, a destination host, a user agent and combinations thereof.

10. The method of claim 8, wherein said entity score is selected from a group consisting of: a Boolean value, a numerical value, a unit interval, a value within a range, a percentage value, a decimal value, a numerical ratio value, a key word, a descriptive text, a tagged label and combinations thereof.

11. The method of claim 8, wherein said risk factor is selected from a group consisting of: malicious, non-malicious, threatening, non-threatening, legitimate and suspicious.

12. The method of claim 8, wherein said data repository comprises at least one database.

13. The method of claim 8, wherein the step of aggregating said plurality of log files comprises: retrieving at least one assessment attribute from said at least one log record; associating said at least one assessment attribute with a new entity record; and storing said new entity record.

14. The method of claim 8, wherein the step of aggregating said plurality of log files comprises: retrieving at least one assessment attribute from said at least one log record; associating said at least one assessment attribute with an existing entity record; and updating said existing entity record.

15. The method of claim 8, wherein the step of generating said risk factor for at least one suspect entity comprises: performing a voting analysis by assigning to said at least one suspect entity the count of said at least one third-party security product determining that one of said set of network entities is considered as a malicious entity.

16. The method of claim 15, wherein the step of performing voting analysis further comprises: performing rule mapping analysis such that said entity score is mapped to a known entity score.

17. The method of claim 8, wherein the step of generating a risk factor for at least one suspect entity comprises: assigning a weighting factor to said at least one third-party security product, said weighting factor representing risk factor reliability of the at least one third-party security product; generating a weighted risk value for each of said set of network entities, said weighted risk value being the product of the risk rating assigned by said at least one third-party security product and the associated weighting factor; and finding the average value of a plurality of said weighted risk values.

18. The method of claim 8, wherein the step of generating a risk factor for at least one suspect entity comprises utilizing a machine learning classifier.

19. The method of claim 8, wherein further comprising the step of: generating an output report comprising data pertaining to the risk factor associated with each of said set of network entities.

20. The method of claim 19, wherein said output report is configured to be transmitted via said communication network to one of said plurality of client networks.

21. The method of claim 8, wherein further comprising the step of: generating an alert associated with a detectable security incident associated with one of said set of network entities, said alert is configured to be transmitted via said communication network.

22. The method of claim 8, wherein said step of generating a risk factor further comprises: classifying said each of said set of network entities according to associated said entity score; and storing data pertaining to said risk factor into a classification database.

23. The method of claim 8, wherein said step of generating a risk factor further comprises: generating an output list of potentially compromised network entities, if said risk factor indicates that said at least one suspect entity is malicious, said output list comprising each of said set of network entities communicating with said at least one suspect entity.

24. A method for protecting a plurality of client networks from security threats using a crowdsourcing log analysis system to block communication of a network element indicated as being a risk of being a security threat, said system comprising at least one breach detection platform, a plurality of server machines associated with at least one of said plurality of client networks, each of said plurality of server machines configured to execute a product associated with a security product vendor and log associated information of at least one of a set of network entities into at least one log file, said system connectable with said plurality of client networks via a communication network, said method for operating each of said plurality of client networks in an improved manner, the method comprising:

connecting, via said communication network, to said at least one breach detection platform, said at least one breach detection platform comprising at least one data repository connectable via a computer network;

uploading, via said communication network, said at least one log file to said at least one breach detection platform;

receiving from said at least one breach detection platform, via said communication network, a risk factor attribute associated with a detectable security event associated with said at least one of said set of network entities; and blocking of communication for said at least one network entity based upon at least said risk factor being indicative of said at least one network entity being a security threat.

25. The method of claim 24, wherein said step of receiving a risk factor attribute, comprises: receiving, via said communication network, at least one report comprising data pertaining to said risk factor attribute.

26. The method of claim 24, wherein said step of receiving a risk factor attribute, comprises: receiving, via said communication network, at least one alert comprising data pertaining to said risk factor indicating a malicious activity associated with said at least one of said set of network entities.

27. The method of claim 24, wherein said risk factor is selected from a group consisting of: malicious, non-malicious, threatening, non-threatening, legitimate and suspicious.

\* \* \* \* \*